United States Patent [19]

Hovorka

[11] Patent Number: 4,829,207

[45] Date of Patent: May 9, 1989

[54] ENHANCED ELECTROMAGNETIC RADIATION TRANSMISSION DEVICE

[75] Inventor: Jiri J. Hovorka, Muskogee, Okla.

[73] Assignee: Marketing Systems of the South, Inc., Tulsa, Okla.

[21] Appl. No.: 941,714

[22] Filed: Dec. 9, 1986

[51] Int. Cl.[4] ............................................. H02K 1/12
[52] U.S. Cl. .................................... 310/254; 310/216
[58] Field of Search ............. 310/42, 44, 45, 216–218, 310/254–259; 336/219, 234

[56] References Cited

U.S. PATENT DOCUMENTS

| | | | |
|---|---|---|---|
| 1,316,798 | 9/1919 | Lamme . | |
| 1,877,569 | 9/1932 | Falkenthal | 310/45 UX |
| 2,037,606 | 4/1936 | Van Der Woude . | |
| 2,387,073 | 10/1945 | Horlacher | 310/44 UX |
| 2,456,982 | 12/1948 | Moore | 310/216 UX |
| 2,721,278 | 10/1955 | Baumann et al. | 310/44 |
| 2,886,722 | 5/1959 | Moehlenpah . | |
| 3,899,701 | 8/1975 | Ogawa et al. | 310/40 MM |
| 4,004,167 | 1/1977 | Meckling | 310/446 |
| 4,025,379 | 5/1977 | Whetstone | 336/219 |
| 4,260,926 | 4/1981 | Jarret et al. | 310/163 |
| 4,479,104 | 10/1984 | Ettinger et al. | 336/219 |

Primary Examiner—Patrick R. Salce
Assistant Examiner—Judson H. Jones
Attorney, Agent, or Firm—Staas & Halsey

[57] ABSTRACT

The present invention provides enhanced electromagnetic radiation transmission by providing an electrically conductive lamination between the silicon iron laminations in transformers, motors, alternators and solenoids. The conductive laminations increase the transmission of electromotive force and enhance cooling. An alternative to providing conductive laminations in a laminated core or stator is to provide a solid sintered metal core including iron, silicon and a conductor. Each transformer also includes a conductive amplifier coil connected in series with the primary coil and circling the primary coil and another conductive coil connected in series with the secondary coil and circling the secondary coil. The coils take advantage of the negative induction current described by Lenz's law to increase efficiency. In a motor, the stator laminations are optionally surrounded by a conductive amplifier coil which produces an amplification effect. The resulting transformer, motor or generator has increased efficiency, decreased input current, decreased loss resulting in a decrease in operating temperature.

13 Claims, 5 Drawing Sheets

ENHANCED ELECTROMAGNETIC RADIATION TRANSMISSION DEVICE

BACKGROUND OF THE INVENTION

The present invention is directed to an enhanced electromagnetic radiation coupling device and, more particularly, to a conductive lamination coating, conductive core lamination or a sintered metal core and additional windings or coils added to a transformer, motor, alternator or solenoid that increases the energy transmission efficiency and cooling of the device.

Recent improvements in motors and other electromagnetic energy transformation devices have concentrated on the control systems and very little attention has been given to improving energy transfer efficiency in the basic device. There is a constant demand for increased efficiency in energy transmission devices that use electromotive and magnetomotive forces. Improvements of only a few percent produce tremendous energy and cost savings due to the lower amounts of fuel used by electric generating companies.

SUMMARY OF THE INVENTION

It is an object of the present invention to increase the energy conversion efficiency as well as the cooling efficiency of transformers, motors, alternators and solenoids.

It is another object of the present invention to provide an electromagnetic radiation amplifier that can be adapted to many uses.

It is an additional object of the present invention to provide a lamination which will increase electromotive force transmission while also improving cooling.

It is a further object of the present invention to decrease current in transformer primary windings while increasing voltage in secondary windings.

The above objects can be attained by providing a conductive lamination attached to the silicon iron laminations in transformers, motors, alternators and solenoids. The conductive lamination increases the transmission of electromotive force and enhances cooling. An alternative is to substitute a solid sintered metal mass for the core or stator laminations. Each transformer also includes a conductive amplifier coil connected in series with the primary coil and circling the primary coil and another conductive amplifier coil connected in series with the secondary coil and circling the secondary coil. The amplifier coils take advantage of the negative induced voltage produced by the change in flux linkage to increase the amplitude of the current and voltage waveforms.

These together with other objects and advantages which will be subsequently apparent, reside in the details of construction and operation as more fully hereinafter described and claimed, reference being had to accompanying drawings forming a part hereof, wherein like numerals refer to like parts throughout.

DESCRIPTION OF THE PREFERRED EMBODIMENTS

Figure 1:
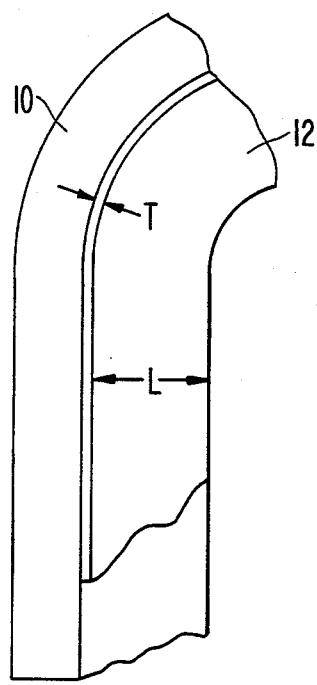
FIG. 1 illustrates the laminations 10 and 12 in a transformer in accordance with the present invention.
Figure 2:
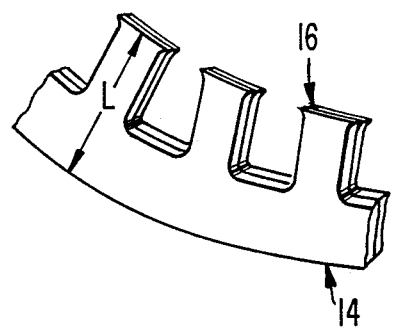
FIG. 2 illustrates the laminations 14 and 16 of the present invention as applied to the stator of a motor or alternator.

In todays transformers and motors, the silicon iron core laminations are excellent conductors of magnetomotive force but very poor conductors of electromotive force. FIG. 1 illustrates an improvement in the laminations of a transformer in which a silicon iron lamination 10 has bonded thereto a conductive film lamination 12 made from a conductor, such as aluminum. The film 12 can be bonded to the iron lamination 10 by a pressure bond or a plastic coated bond or other well known bonding techniques. The addition of the conductive lamination to the core ensures a positive transmission of electromotive force because of the reduced resistance to the transmission of the electromotive force and, as a result, increases the output of the transformer while improving temperature control. That is, the film 12 acts as an amplifier of the transmission of electromotive force. The conductive lamination 12 must be interrupted at some point in the core circuit to prevent the creation of a closed loop. For example, an interruption in the lamination 0.01 inches wide will be sufficient. FIG. 2 provides a similar illustration for a conductive lamination or conductive resin spray applied to the stator of a polyphase motor or to a transformer.

The thickness of each conductive laminations in a polyphase induction motor or transformer is determined in accordance with:

$$Am = (0.020 \cdot Im)/Nm \tag{1}$$

$$Tm = Am/Lm \tag{2}$$

where Tm equals the desired thickness of a conductive lamination bonded only to one side of a silicon iron lamination, while Im equals the amperes of current at full load, Nm is the number of laminations in the assembly and Lm is the cross-sectional vertical length in inches of the stator section as illustrated in FIG. 2. However, a thickness of approximately 0.026 inches will be acceptable in most cases.

To determine the thickness of the conductive film laminations 12 attached to the silicon iron laminations 10 in a generator, the following formulas can be used:

$$Ag = 0.00053 \cdot Ig/Ng \tag{3}$$

$$Tg = Ag/Lg \qquad (4)$$

In the above formulas Ig equals the current to be transmitted or generated respectively; Ng equals the number of laminations; Lg equals the length in the cross section of a core lamination, as illustrated in FIG. 1; and Tg is the thickness.

If a generator is to transmit through the core and windings, a total current of 60 amperes using a core consisting of 19 silicon iron laminations and 17 conductive laminations with a cross sectional length of 0.562 inches, the conductive laminations should be 0.003 inches thick.

Instead of using a pure conductor lamination film 12, such as aluminum, copper, gold, etc., applied to the silicon iron lamination it is possible to use an an alloy or a conductor based resin spray to achieve a coating of the proper thickness. Such a spray could be, for example, aluminum particles mixed with an epoxy resin at a ratio of 50% each. The use of the aluminum based resin spray will not produce a closed coil effect and the resin compound provides additional positive insulation between the silicon iron core laminations 10.

The above discussions of the amplifying effect of the conductive laminations in a laminated core or stator can be accomplished in small motors, alternators and transformers by using a solid sintered metal core or stator. The sintered metal core includes iron, silicon and a conductor such as aluminum. The sintered metal provides a material that is capable of transmitting both electromotive force and magnetomotive force. To produce the sintered metal mass, iron powder, silicon powder and aluminum powder are uniformly mixed with iron comprising 93.5% of the mixture by weight, silicon 5% and aluminum 1.5%. The powder mixture is poured into a form and compressed using a 500 ton press to a density of 5.8–6.0 gm/cc. The resulting green stage core or stator is placed in a furnace at 1525° F. for approximately 3 hours. The resulting core or stator provides the improved efficiency of the laminated versions yet drastically reduces the cost of manufacturing.

A further improvement to a transformer can be obtained by taking advantage of Lenz's law which states that the voltage induced in a transformer, motor, alternator or solenoid is always in such a direction as to tend to oppose the change in flux linkage which produces it. Consider, for example, the case of a coil linked by a decreasing flux. If a closed path is provided, the current caused by the induced voltage will be in such a direction as to produce additional flux. The negative current thus produced in the secondary transformer turns comprises a load component of the magnetomotive force in such a direction as to oppose the flux produced by the primary winding, resulting in a current increase in the primary winding. A negative current capture coil or magnetomotive force amplifier according to the present invention surrounding the primary and secondary coils of the transformer and in series therewith will harness the effect produced according to Lenz's law.

Figure 3:
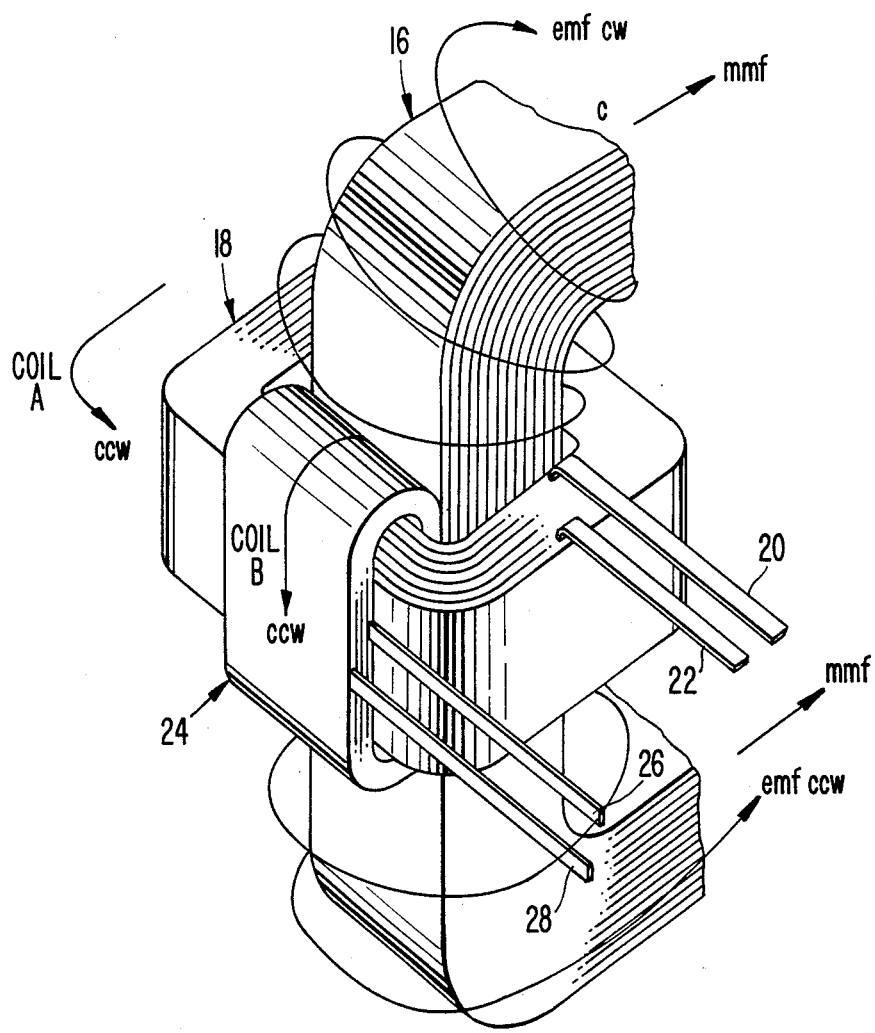
FIG. 3 illustrates the conductive coil 24 of the present invention incorporated into the primary section of a transformer.

FIG. 3 illustrates the amplifier coil applied to the primary section of a transformer. A transformer laminated core 16 which, for improved efficiency, would include the laminations as discussed with respect to FIG. 1, is surrounded by primary coil 18 having leads 20 and 22. Lead 20 is connected to the innermost coil winding while lead 22 is connected to the outermost winding. The amplifier coil 24 wraps around the primary coil 18 and includes leads 26 and 28. The coils 18 and 24 should be insulated from each other using insulated wire or paper layers as in well known transformer insulation techniques. Lead 26 is connected to the innermost winding while lead 28 is connected to the outermost winding. These coils are wound in a known manner in accordance with normal transformer production techniques. The coils 18 and 24 are connected in series by connecting leads 22 and 26 to each other and leads 20 and 28 to the alternating current power source. The arrows associated with coils 18 and 24 indicate a counter clockwise winding direction for the coils when leads 22 and 26 are connected. The connections would be reversed if the coils 18 and 24 were wound in the clockwise direction. At the top of FIG. 3 the direction of the magnetomotive force and electromotive force when current is travelling in one direction in the primary coil are depicted while at the bottom of FIG. 3 the direction of magnetomotive force and electromotive force are indicated when the current in the primary coil 18 is travelling in the opposite direction.

Figure 4:
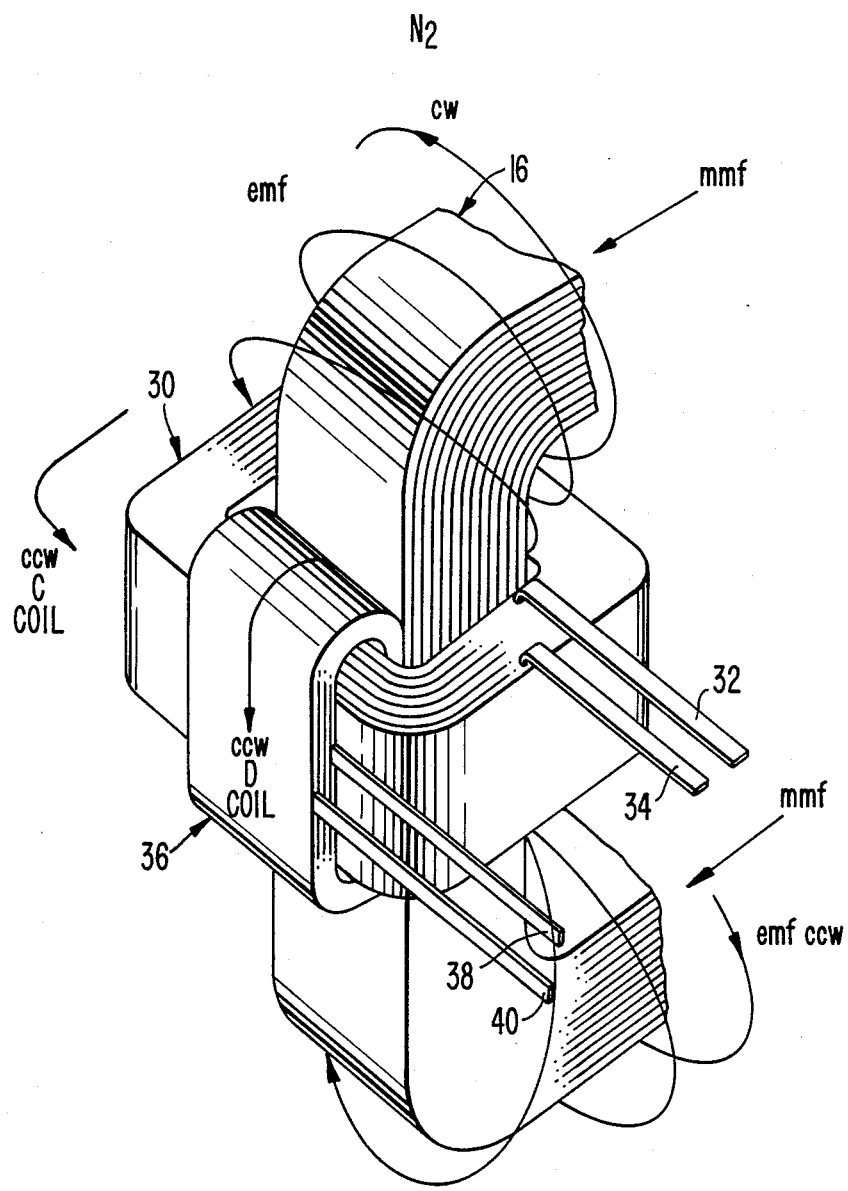
FIG. 4 depicts the conductive coil 36 of the present invention in the secondary section of the transformer.

FIG. 4 illustrates the amplifier coil as applied to the secondary section of the transformer. The secondary coil 30 is wrapped around the transformer core laminations 16 and includes leads 32 and 34. Lead 32 is connected to the innermost winding while lead 34 is connected to the outermost winding. The amplifier coil 36 surrounds the primary coil and includes leads 38 and 50. Lead 38 is connected to the innermost coil winding while lead 40 is connected to the outermost coil winding. The leads 34 and 38 are connected to each other while leads 32 and 40 are connected to the load. The leads are connected in this manner when the coils are wound in a counter clockwise manner, as illustrated in FIG. 4. If the coils are wound in a clockwise direction, then the lead connections should be reversed accordingly. Both the primary and secondary coils must have amplifier coils for the present invention to operate properly. In both the primary and secondary sections of the transformer, an insulated sheet conductor could be substituted for the amplifier coils.

Figure 5:
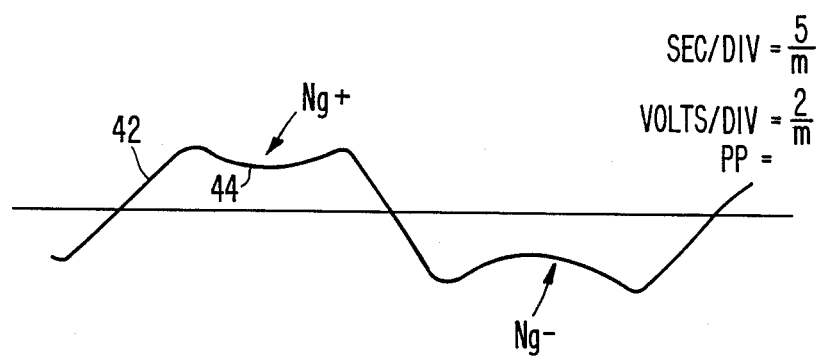
FIG. 5 is the voltage waveform of the voltage in the coils D and B when the secondary is not loaded.
Figure 6:
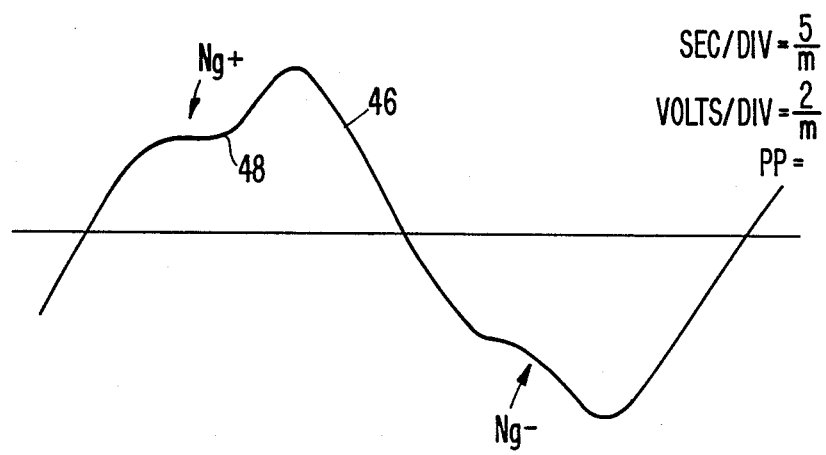
FIG. 6 is the coil waveform when the secondary is loaded.
Figure 7:
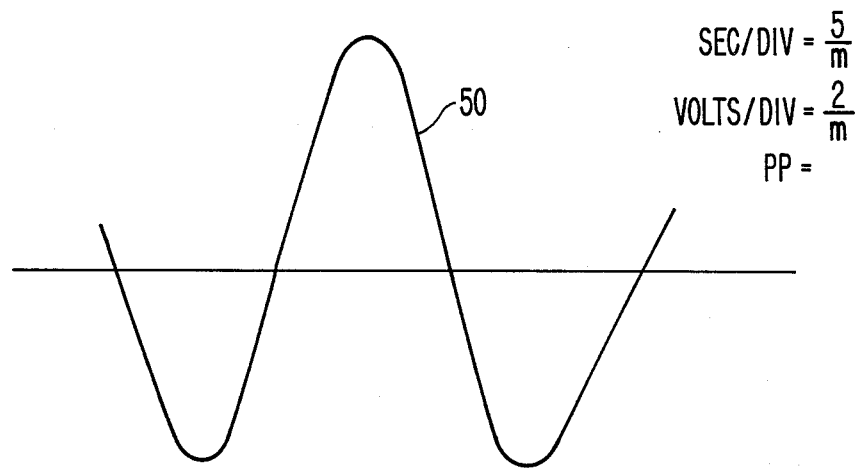
FIG. 7 illustrates the coil waveform when the secondary is loaded and the present invention is properly connected.

The electromagnetic radiation amplifier coils 24 and 36 wired in series with the input and output current paths of respective transformer coils provides a definite improvement in the efficiency of the transformer, as illustrated by FIGS. 5-7. FIG. 5 is a waveform produced by either coil 24 or 36 when there is no load on the secondary coil. The dip in the waveform (Ng+) clearly depicts the negative inductive current that occurs in the primary and secondary winding. FIG. 6 illustrates the same waveform as seen on an oscilloscope connected to either coil 24 or 36 under a load condition on the secondary coil 30. The inductive current generated by the primary windings is increased in a peak to peak measurement; however, the effect of the negative current (Ng+) which opposes it is still apparent but greatly reduced.

FIG. 7 is a waveform as seen on a oscilloscope connected to either coil 24 or 36 during a load condition of the secondary coil 30 when the coils 24 and 36 are connected in series with coils 18 and 30, respectively, as discussed previously. The present invention reduces the current in the primary winding and increases the voltage on the secondary winding due to the increase in the induced current caused by the reduction in the negative current. The reduction in primary winding current reduces heat. The inductive current generated by the primary windings measured peak-to-peak produces a clear sign wave and if compared to the same waveform for the transformer when coils 24 and 36 are not present will show a substantial improvement in the peak to peak values.

Figure 8:
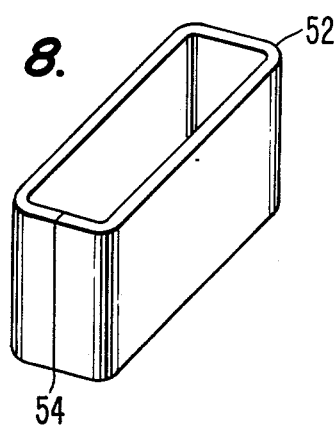
FIG. 8 depicts a stator coil 52 in accordance with the present invention.

FIG. 8 illustrates an electromagnetic radiation coil amplifier 52 as would be applied to a stator of a motor or an alternator. The thickness should be calculated in accordance with equations (1) and (2) previously discussed. The coil includes a break 54 or interruption which prevents a closed loop from being created. The gap 54 should be approximately 0.010 inches wide. The amplifier coil 52 is once again made of a pure conductor such as aluminum or a conductor alloy.

Figure 9:
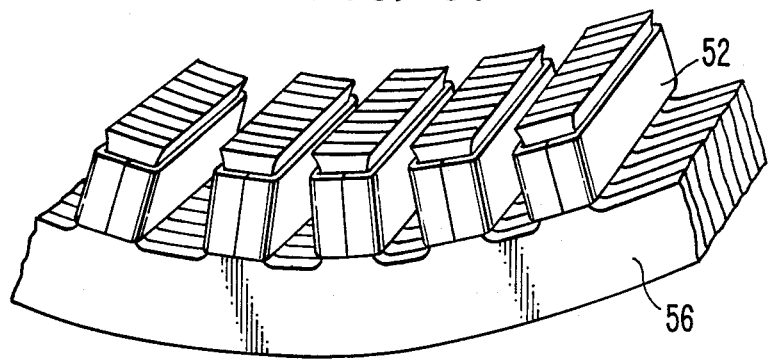
FIG. 9 depicts the coil 52 applied to the stator 56 of a motor or an alternator.

FIG. 9 illustrates the amplifier coil 52 applied to the stator laminations 56 of a motor or alternator.

Figure 10:
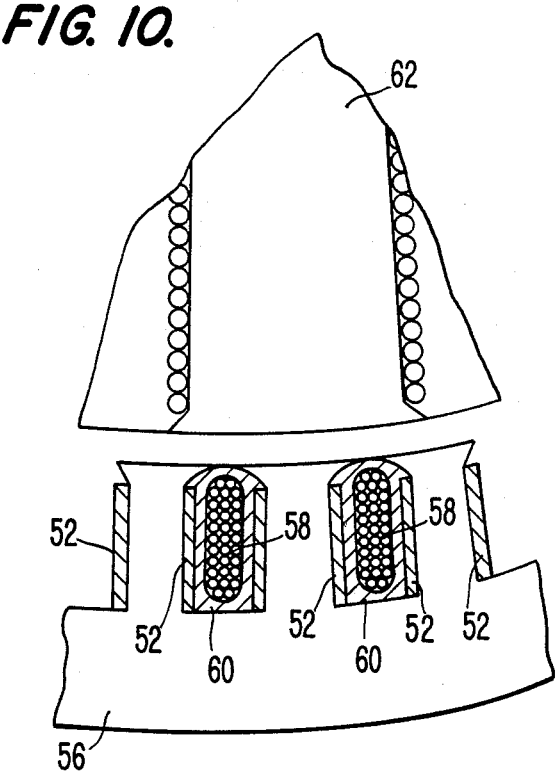
FIG. 10 illustrates the windings of the stator 56 and their relationship to the coil 52 of the present invention.

FIG. 10 illustrates the present invention incorporated into a wound stator and shows the relationship to the motor rotor 62. The stator laminations 56 are surrounded by the amplifier coil 52, as previously discussed, and the conductive (copper) windings 58 are insulated from the amplifier coil 52 by epoxy insulation 60. The epoxy 60 insulation could also be other types of standard winding insulation such as plastic impregnated paper. The windings are the same gauge as would normally be used in the stator 56.

In a stator in which only a conductive or film lamination is applied to the laminations where the thickness of the conductive lamination is 0.001 inches, an improvement in voltage output of 70% is obtainable, an increase in current output by 23% is attainable while the wattage output by the alternator is increased by 106%. If the amplifier coil alone is applied to the alternator with a coil thickness of 0.01 inches, an increase in voltage output of 36% is attainable with an increase in current output of 25% and a wattage increase of 78%. The improvement in wattage losses equivalent to reduced temperature since one watt of energy output equals a 0.068683° C. drop in operating temperature.

Figure 11:
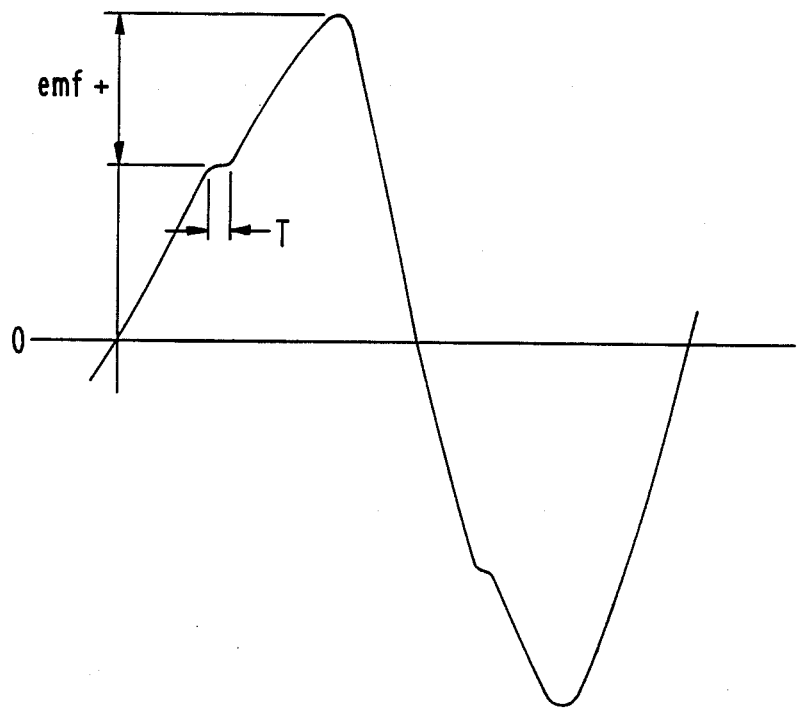
FIG. 11 depicts the increased electromagnetic force produced by the present invention.

FIG. 11 illustrates the operation of the amplifier coil 52 and laminations 54. The magnetic direct current pull of the rotor 62 as it passes over the stator 56 induces a flow of electromotive and magnetomotive force in the stator 56. The single coil 52 and/or conductive laminations 14 of the stator result in an induced high current in the stator 56, essentially acting as additional windings in the stator 56, so that the stator receives the total electromotive energy increase with a microsecond time delay T. The increased electromotive force results in a higher peak-to-peak waveform.

The many features and advantages of the invention are apparent from the detailed specification and thus, it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly, all suitable modifications and equivalents may be resorted to, falling within the scope of the invention.

I claim:

1. A transformer, comprising:
   a core comprising electrical conduction enhancement means for enhancing an electromagnetic force coupled by said core, said core including silicon iron laminations and said enhancement means comprising a conductive resin including a mixture of conductive particles and non-conductive resin;
   a primary coil wrapped around said core;
   a secondary coil wrapped around said core; and
   first and second coil amplifying means, coupled to said primary and secondary coils, for amplifying the force coupled by said core.

2. A transformer as recited in claim 1, wherein said silicon iron laminations are sintered metal laminations comprising iron, silicon and a conductor.

3. A transformer as recited in claim 1, wherein said first coil amplifying means comprises a first coil wrapped around said primary coil and electrically connected in series therewith and said second coil amplifying means comprises a second coil wrapped around said secondary coil and electrically connected in series therewith.

4. A transformer, comprising: a laminated core including:
   silicon iron laminations; and
   conductive resin laminations between the silicon iron laminations, said conductive resin laminations comprising a mixture of conductive particles and a non-conductive resin, said conductive resin laminations being approximately 0.026 inches thick;
   a primary coil wrapped around said core;
   a first coil connected in series with said primary coil and wrapped around said primary coil;
   a secondary coil wrapped around said core; and
   a second coil connected in series with said secondary coil and wrapped around said secondary coil.

5. A stator for an alternator or a motor, said stator comprising:
   silicon iron laminations; and
   electrical conduction enhancement means, adjacent said silicon iron laminations, for enhancing the electromotive force couple by said laminations, said enhancement means comprising conductive resin laminations between said silicon iron laminations, said conductive resin laminations comprising a mixture of conductive particles and a non-conductive resin, and a thickness of each said conductive resin lamination is approximately $$TG = ((0.00053 \cdot IG)/NG)/LG$$

where IG equals generated current, NG equals the number of laminations and LG equals the cross section length of a silicon iron lamination.

6. A stator as recited in claim 5, wherein said enhancement means further comprises a conductive coil wrapped around said silicon iron laminations.

7. A stator as recited in claim 5 wherein said conductive lamination is approximately 0.003 inches thick.

8. A stator for an alternator or motor, said stator comprising:
   silicon iron laminations;
   conductive resin laminations between said silicon iron laminations, said conductive resin laminations comprising a mixture of conductive particles and a non-conductive resin, and a thickness of each conductive resin lamination is approximately $$TG = ((0.00053 \cdot IG)/NG)/LG$$

thick, where IG equals generated current, NG equals the number of laminations and LG equals the cross section length of a silicon iron lamination; and
   a conductive coil surrounding said silicon iron laminations and said conductive laminations.

9. A stator as recited in claim 8, wherein each conductive lamination is approximately 0.003 inches thick.

10. A stator as recited in claim 8, wherein each silicon iron lamination comprises a sintered metal mass including iron, silicon and a conductor.

11. A stator as recited in claim 8, wherein said mass includes 93.5% iron by weight, 5.0% silicon by weight and 1.5% aluminum by weight.

12. A transformer, comprising:
a core comprising electrical conduction enhancement means for enhancing an electromagnetic force coupled by said core, said core including silicon iron laminations and said enhancement means comprising a conductive resin lamination including a mixture of conductive particles and non-conductive resin, a thickness of each conductive resin lamination is approximately $$TM = ((0.02 \cdot IM)/NM)/LM)$$

thick, where TM equals thickness, IM equals amperes at full load, NM equals the number of laminations and LM is the cross sectional vertical length;
a primary coil wrapped around said core; and
a secondary coil wrapped around said core.

13. A transformer as recited in claim 12, wherein said conductive resin lamination is approximately 0.026 inches thick.

* * * * *